Nov. 1, 1938.  O. M. SEMAN  2,135,043
APPARATUS FOR WASHING, RINSING, AND DRYING CROCKERY, LAUNDRY, AND THE LIKE
Filed June 15, 1936  2 Sheets-Sheet 1
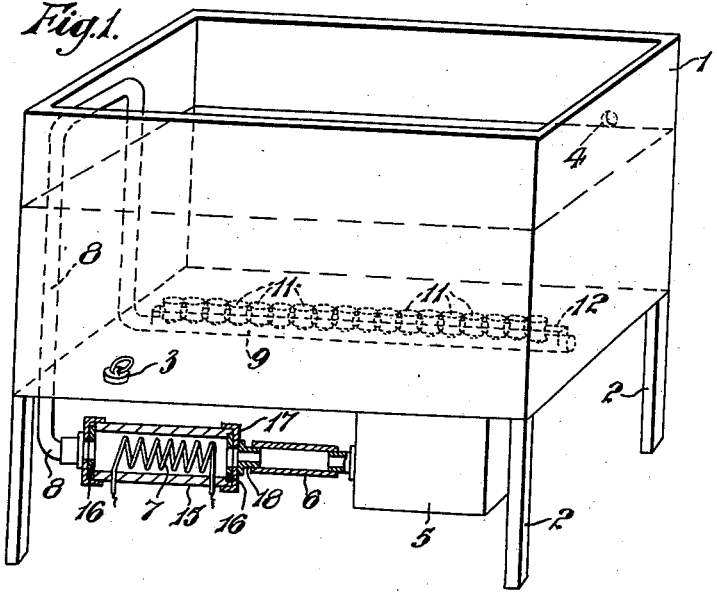
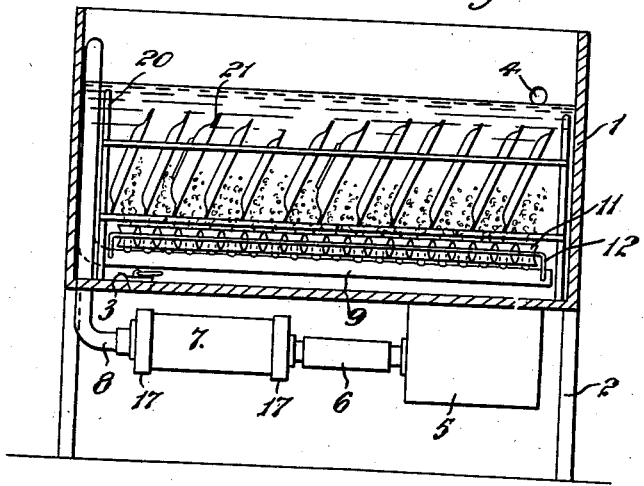
Inventor
Otto Markus Seman
by [signature] atty Nov. 1, 1938.     O. M. SEMAN     2,135,043
APPARATUS FOR WASHING, RINSING, AND DRYING CROCKERY, LAUNDRY, AND THE LIKE
Filed June 15, 1936     2 Sheets-Sheet 2
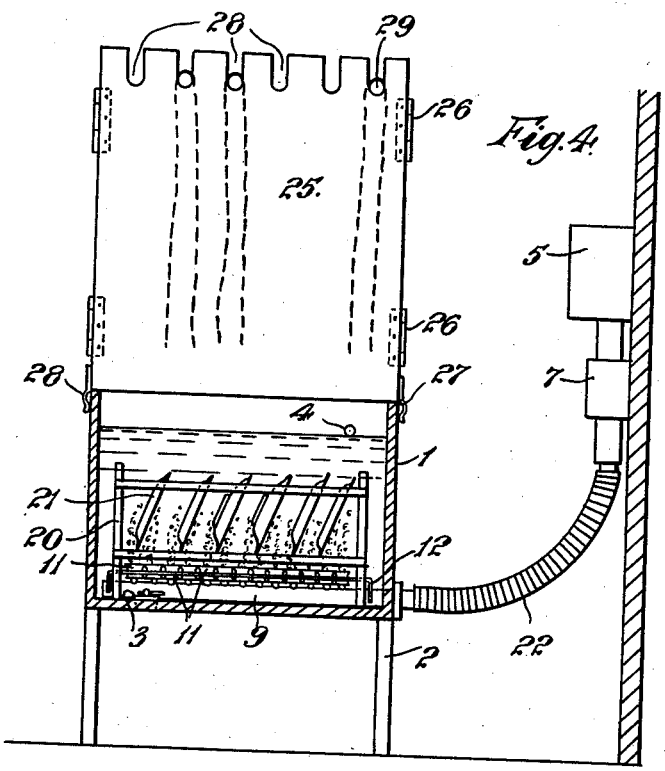
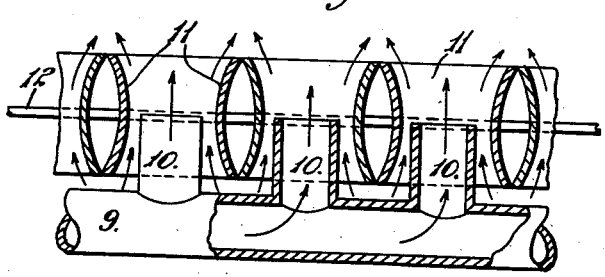
Inventor
Otto Markus Seman Patented Nov. 1, 1938

2,135,043

UNITED STATES PATENT OFFICE 2,135,043

APPARATUS FOR WASHING, RINSING AND DRYING CROCKERY, LAUNDRY AND THE LIKE

Otto Markus Seman, Balham, London, England

Application June 15, 1936, Serial No. 85,238
In Great Britain June 25, 1935

1 Claim. (Cl. 261—77)

This invention relates to apparatus for washing, rinsing and drying crockery, laundry and the like. More particularly, the invention relates to dish washing machines and to an apparatus or device adapted to be attached as a fitment to a sink, tank, container or the like, to convert the same into a dish washing machine and/or a drying cabinet.

The apparatus of the present invention is designed to cause directed streams consisting of a mixture of highly heated air and water to impinge at high velocity upon the crockery, laundry or the like, to be washed.

In carrying out the invention, the mixture of highly heated air and water which is caused to impinge on the crockery or the like is produced with the aid of a tube provided with a plurality of injector devices along its length, which tube is immersed in the washing liquid and supplied with a current of highly heated air produced for example by a compressor and a heater.

In order more clearly to understand the invention, reference is made to the accompanying drawings which illustrate diagrammatically and by way of example, two embodiments thereof, in which:—

Fig. 1 is a perspective view partly in section of one embodiment;

Fig. 2 is a cross-section;

Fig. 3 is a detail partly in section; and

Fig. 4 is a vertical section through a second embodiment.

In said drawings, like parts are denoted by like reference numerals.

In Figs. 1 and 2, 1 denotes a tank or container which may be covered by a lid (not shown) and which is mounted on supports 2, and provided with a drain plug 3 and overflow 4. Mounted beneath the tank 1, is an electrically driven compressor 5, forcing air through a flexible tube 6 of rubber or the like into an electric heater 7, which will hereinafter be more fully described. The heated air passes through a conduit 8 rising above the level of the liquid in the tank 1 and then descending into a tube 9, mounted in the lower portion of the tank 1. Said tube 9 is provided with a plurality of injector members as shown more clearly in Fig. 3 of the drawings, each injector comprising a nozzle 10, branching from the tube 9 and a Venturi tube 11. The Venturi tubes are supported by wires 12 which maintain them in the correct spaced relationship from the tube 9 and nozzles 10.

The electric heater 7 consists of a heating element of any suitable type mounted in a cylinder 15 of heat insulating material such as an asbestos-cement composition. At the ends of said cylinder are inserted apertured discs 16 which are likewise of heat insulating material, which discs in turn are covered by metal end covers 17, each provided with a nipple or union 18. By virtue of this construction, it is impossible for the heat generated by the heater to be transmitted to the compressor 5 or to other parts of the apparatus.

When it is intended to use the machine for washing up, a plate-rack or the like 20 is loosely placed in the tank 1, with the bottom of the rack slightly above the tops of the Venturi tubes 11 and the plates 21 are placed in the plate rack so that they are slightly inclined. The tank is filled with water and the compressor 5 and heater 7 are set into operation. A current of hot air preferably at a temperature of about 300° F. thereupon issues through the nozzles 10. By virtue of the injector action of the Venturi tubes 11, a turbulent movement is imparted to the water, whilst at the same time a plurality of currents of water are caused to impinge on the surfaces of the plates. In this manner an intensive cleaning action is exerted on the crockery.

Crockery is cleaned with great rapidity, even dried egg and mustard being removed therefrom within the course of a few minutes.

The crockery may be dried in situ by merely draining the water through the plug hole 3, whilst the compressor 5 and heater 7 continue in operation.

Fig. 4 shows a second embodiment of the invention in which the compressor 5 and heater 7 are permanently fixed to a wall and connected to the pipe 9 by a flexible detachable tube 22. Said pipe 9 may be fixed inside the tank 1, or it may be made removable so that it can be placed in any other sink, tank or container.

Fig. 4 shows in addition, a fitment which enables the apparatus to be converted into a drying chamber for tea cloths, towels and the like. Said fitment comprises an open-ended shaft made from four metal plates 25, hinged together at 26 so as to be collapsed when not in use. Said fitment is clipped on to the tank 1 by means of clips 27 and at its top, is provided with recesses 28, which are adapted to receive towel rails disposed transversely to the longitudinal axis of the pipe 9. If desired, the top end of the shaft may be covered by a lid. The apparatus can be converted into a drying cabinet by merely draining off the water, whilst the compressor 5 and heater 7 continue in operation.

I claim:—

In a washing apparatus, in combination, a liquid container, and means for projecting streams of the liquid upwardly at high velocity through the overlying body of liquid in the container, comprising an air conduit mounted in the bottom of the container, a series of air outlet nozzles projecting upward from the conduit in substantially parallel relation, a Venturi tube support, and a series of submerged, liquid impelling and liquid directing Venturi tubes fixed on the support in the same geometrical arrangement as that of the nozzles on the conduit, said conduit and support cooperating to dispose each Venturi tube in surrounding relation to the outlet end of one of the nozzles, and means for heating the air delivered to the nozzles, whereby a plurality of violent submerged upwardly directed mixed streams of heated air and liquid may be formed for washing submerged articles by the impingement of such streams against such articles.

OTTO MARKUS SEMAN.